United States Patent
An et al.

(10) Patent No.: US 8,738,197 B2
(45) Date of Patent: May 27, 2014

(54) AUTOMATIC VEHICLE GUIDANCE SYSTEM

(75) Inventors: Kyoung Hwan An, Daejeon (KR); Sung Won Sohn, Daejeon (KR); Jong-Hyun Park, Daejeon (KR); Ju Wan Kim, Daejeon (KR); Seong Ik Cho, Daejeon (KR); Jeong Dan Choi, Daejeon (KR); Do Hyun Kim, Daejeon (KR); Kyung Bok Sung, Daejeon (KR); Jungsook Kim, Daejeon (KR); Byung Tae Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 734 days.

(21) Appl. No.: 12/904,478

(22) Filed: Oct. 14, 2010

(65) Prior Publication Data
US 2011/0125344 A1 May 26, 2011

(30) Foreign Application Priority Data
Nov. 26, 2009 (KR) ........................ 10-2009-0115152

(51) Int. Cl.
| | |
|---|---|
| *G05D 1/00* | (2006.01) |
| *G05D 3/00* | (2006.01) |
| *G06F 7/00* | (2006.01) |
| *G06F 17/00* | (2006.01) |

(52) U.S. Cl.
USPC ................................. 701/2; 701/25; 701/26

(58) Field of Classification Search
USPC ............ 701/22, 253, 516, 25, 23, 117, 2, 26, 701/24, 400; 700/255; 342/41
See application file for complete search history.

(56) References Cited

U.S. PATENT DOCUMENTS

| | | | | |
|---|---|---|---|---|
| 6,515,614 | B2 | 2/2003 | Sakai et al. | |
| 7,203,597 | B2 * | 4/2007 | Sato et al. | 701/516 |
| 7,439,902 | B2 * | 10/2008 | Robertson et al. | 342/41 |
| 7,742,841 | B2 * | 6/2010 | Sakai et al. | 700/255 |
| 8,121,730 | B2 * | 2/2012 | Sung et al. | 700/253 |
| 8,437,947 | B2 * | 5/2013 | Yoo et al. | 701/117 |
| 8,447,448 | B2 * | 5/2013 | Scheuerman et al. | 701/22 |
| 2002/0165646 | A1 | 11/2002 | Bohr et al. | |
| 2003/0088344 | A1 * | 5/2003 | Oda et al. | 701/23 |
| 2009/0177347 | A1 | 7/2009 | Breuer et al. | |
| 2010/0042282 | A1 * | 2/2010 | Taguchi et al. | 701/25 |
| 2011/0125344 | A1 * | 5/2011 | An et al. | 701/2 |

FOREIGN PATENT DOCUMENTS

| | | |
|---|---|---|
| JP | 2003-141676 | 5/2003 |
| JP | 2003-523892 | 8/2003 |
| JP | 2007-334435 | 12/2007 |
| JP | 2008-129804 | 6/2008 |
| KR | 10-2002-0032302 | 5/2002 |

* cited by examiner

*Primary Examiner* — Thomas Black
*Assistant Examiner* — Robert Payne
(74) *Attorney, Agent, or Firm* — Staas & Halsey LLP

(57) ABSTRACT

A vehicle controller includes a communications unit for performing data communications with local servers; a local path generation unit for generating, in response to an automatic vehicle guidance service request, a local path based on a driving control command and sensing information received from the local servers via the communications unit; a path-following control unit for generating actuator control signals for controlling actuators of a vehicle to drive the vehicle along the local path; and a vehicle driving unit for driving the actuators according to the actuator control signals. Each local server pre-processes and merges sensor data received from the infra-sensor to generate the sensing information. A global server generates the driving control command based on the sensing information and transmits the driving control command to the local servers.

10 Claims, 11 Drawing Sheets

FIG.5A
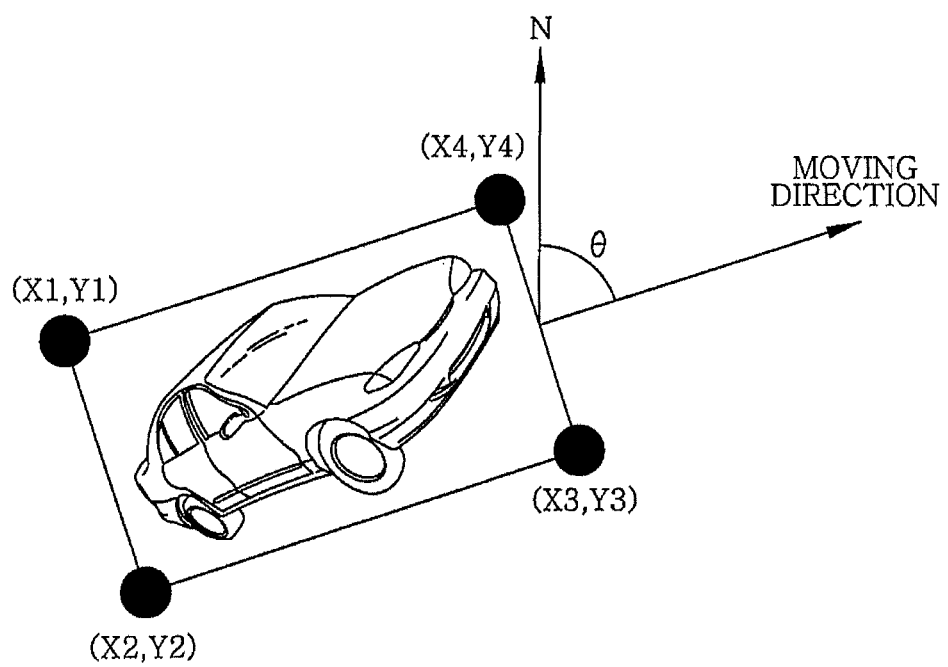
FIG.5B
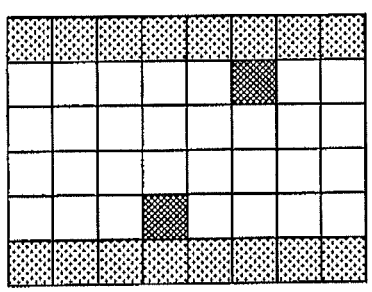
BITMAP FORM
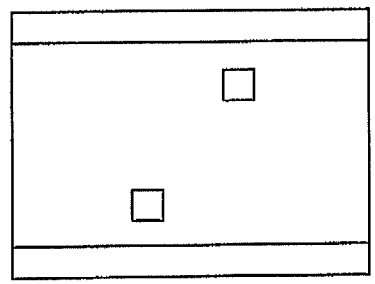
VECTOR FORM

AUTOMATIC VEHICLE GUIDANCE SYSTEM

CROSS-REFERENCE(S) TO RELATED APPLICATION(S)

The present invention claims priority to Korean Patent Application No. 10-2009-0115152, filed on Nov. 26, 2009, which is incorporated herein by reference.

FIELD OF THE INVENTION

The present invention relates to automatic vehicle guidance using a vehicle controller, local servers and a global server; and, more particularly, to an automatic vehicle guidance system in which local servers generate sensing information by using sensor data of sensors installed on roads, a global server generates driving control command by using the sensing information and a vehicle controller performs automatic vehicle guidance according to the driving control command.

BACKGROUND OF THE INVENTION

As well-known in the art, an automatic vehicle guidance system, which is embedded in various driving means to perform automatic vehicle guidance via a driving position search, has been mainly applied to ships and aircrafts. Recently, the autonomous driving system is also being applied to vehicles driving on roads to inform a driver of various driving information, e.g., driving routes and road traffic congestion levels, via a monitor, or to perform automatic vehicle guidance by itself.

In case for a moving body such as a vehicle moving on roads at a high speed, in order to recognize driving environment, e.g., the vehicle and obstacles on the roads, and inform a driver of the driving environment or take countermeasures thereto by itself, the automatic vehicle guidance system needs to be provided with a high-performance processor capable of processing large amount of data in real time.

Further, in order for automatic vehicle guidance, sensor equipments, e.g., scanning devices, cameras and radars, computing equipments, vehicle control software and automatic vehicle guidance software need to be mounted on the vehicle.

However, since the sensor equipments and the computing equipment are expensive, commercialization of the above-described automatic vehicle guidance system has been much limited. Furthermore, even if such equipments are mounted on a vehicle to perform automatic vehicle guidance, an event occurred in a region out of sensing ranges of the sensing equipments mounted on the vehicle cannot be recognized.

SUMMARY OF THE INVENTION

In view of the above, the present invention provides an automatic vehicle guidance system in which local servers generate sensing information by using sensor data of sensors installed on roads, a global server generates driving control command by using the sensing information and a vehicle controller performs automatic vehicle guidance according to the driving control command.

In accordance with a first aspect of the present invention, there is provided a vehicle controller, including:

a communications unit for performing data communications with local servers;

a local path generation unit for generating, in response to an automatic vehicle guidance service request, a local path based on a driving control command and sensing information received from the local servers via the communications unit;

a path-following control unit for generating actuator control signals for controlling actuators of a vehicle to drive the vehicle along the local path; and a vehicle driving unit for driving the actuators according to the actuator control signals.

Preferably, the driving control command includes a global path from a starting point to a destination.

Preferably, the sensing information includes at least one of vehicle sensing information and obstacle sensing information, the vehicle sensing information being information on the vehicle and the obstacle sensing information being information on obstacles on roads.

In accordance with a second aspect of the present invention, there is provided a local server, including:

a communications unit for performing wireless communications with a vehicle controller and an infra-sensor while performing wired communications with a global server;

a sensor control unit for controlling the infra-sensor, transmitting to the global server vehicle information and an automatic vehicle guidance service request message received from the vehicle controller and transmitting to the vehicle controller a driving control command received from the global server;

a sensor data pre-processing unit for pre-processing sensor data received from the infra-sensor;

a sensor data merging unit for merging the pre-processed sensor data to generate sensing information; and a sensor data stream processing unit for storing the sensing information and transmitting the sensing information to the global server and the vehicle controller via the communications unit.

Preferably, the driving control command includes a global path from a starting point to a destination.

Preferably, the sensing information includes at least one of vehicle sensing information and obstacle sensing information, the vehicle sensing information being information on the vehicle and the obstacle sensing information being information on obstacles on roads.

In accordance with a third aspect of the present invention, there is provided a global server, including:

a communications unit for performing data communications with local servers;

a global path generation unit for generating, in response to an autonomous driving service request message received from the local servers, a global path from a starting point to a destination by using road network data;

a driving control command generation unit for generating, based on sensing information received from the local servers, a driving control command for guiding a vehicle along the global path and transmitting the driving control command to the local servers;

a handover processing unit for administrating a handover procedure, between the local servers, on control of automatic vehicle guidance; and a global environment management unit for registering vehicle information received from the local servers, registering the local servers and managing the road network data, wherein the driving control command generation unit selectively finds an alternative path based on the sensing information and reflects the alternative path on the driving control command.

Preferably, the driving control command includes the global path, the alternative path and additional information on a vehicle speed and driving lanes.

Preferably, the sensing information includes at least one of vehicle sensing information and obstacle sensing information, the vehicle sensing information being information on the vehicle and the obstacle sensing information being information on obstacles on roads.

Preferably, in the road network data, a section between two adjacent waypoints is represented by at least one of coordinates of points within the section, a road-design function and an approximation function.

According to the present invention, automatic vehicle guidance can be effectively performed by using sensing information generated by the local server based on sensor data of sensors installed on roads. The global server generates the global path based on the road network data and then generates the driving control command based on the sensing information. The vehicle controller drives the actuators of the vehicle according to the driving control command, thereby performing automatic vehicle guidance.

BRIEF DESCRIPTION OF THE DRAWINGS

The above and other objects and features of the present invention will become apparent from the following description of embodiments, given in conjunction with the accompanying drawings, in which:

FIGS. 5A and 5B illustrates explanatory views for data format of sensing information generated by the local server, wherein FIG. 5A illustrates data format of vehicle sensing information and FIG. 5B illustrates data format of obstacle sensing information;

DETAILED DESCRIPTION OF THE EMBODIMENTS

Hereinafter, embodiments of the present invention will be described in detail with reference to the accompanying drawings, which form a part hereof.

Figure 1:
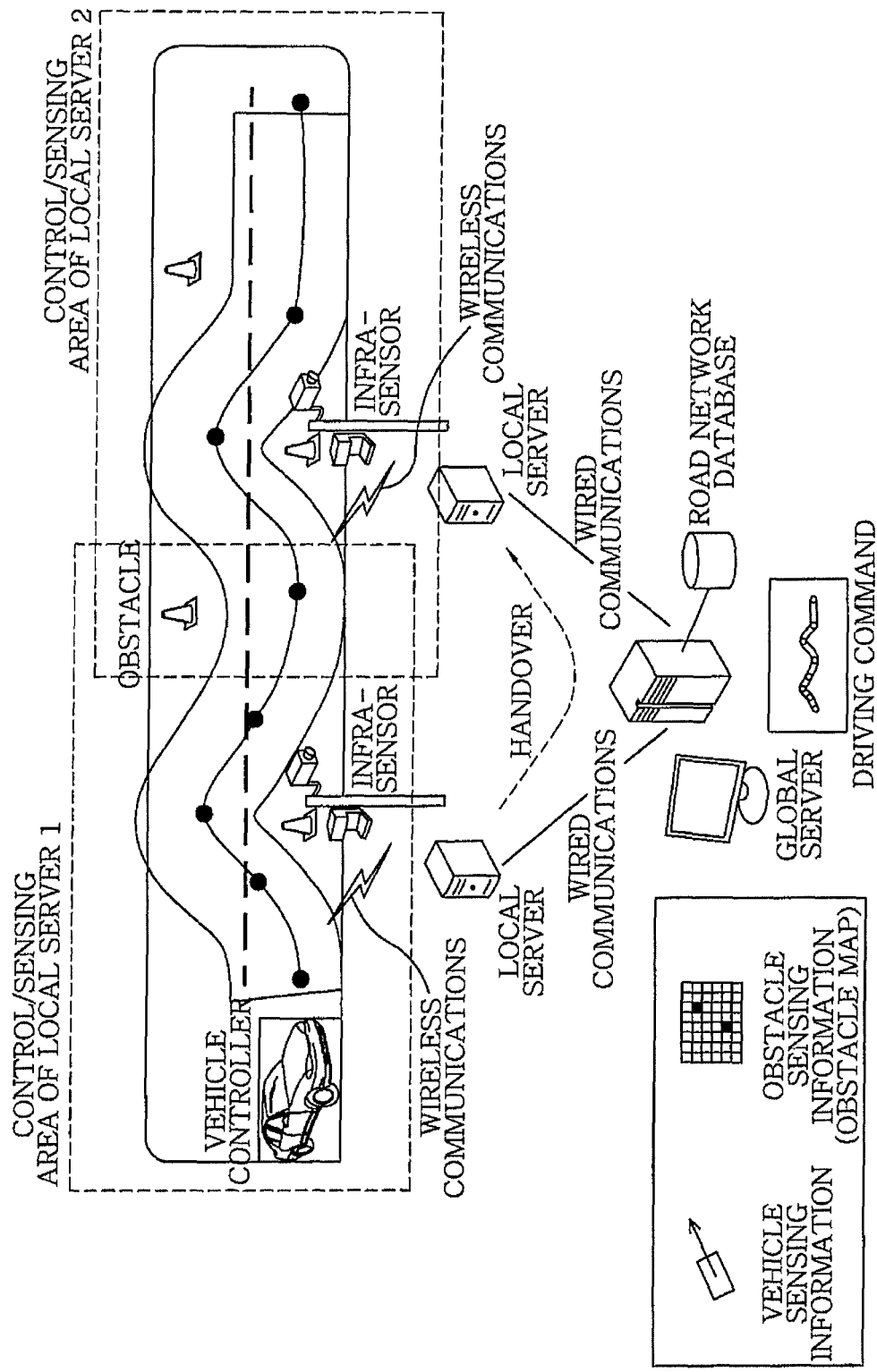
FIG. 1 illustrates a schematic view for explaining overall operation of an automatic vehicle guidance system in accordance with an embodiment of the present invention.

FIG. 1 illustrates a schematic view for explaining overall operation of an automatic vehicle guidance system in accordance with an embodiment of the present invention.

As shown in FIG. 1, the automatic vehicle guidance system may include a vehicle controller mounted on a vehicle, local servers, a global server and infra-sensors installed on roads. The local servers perform wireless communications with the vehicle controller, while performing wired communications with the global server. Further, the local servers receive sensor data, i.e., information on obstacles on the roads and the vehicle, from the infra-sensors and transmit vehicle sensing information and obstacle sensing information to the global server. The global server generates a driving control command for the vehicle based on the sensing information and road network data, and the vehicle controller performs automatic vehicle guidance according to the driving control command. Further, the global server administrates a handover procedure of the vehicle moving within control areas of the local servers.

Figure 2:
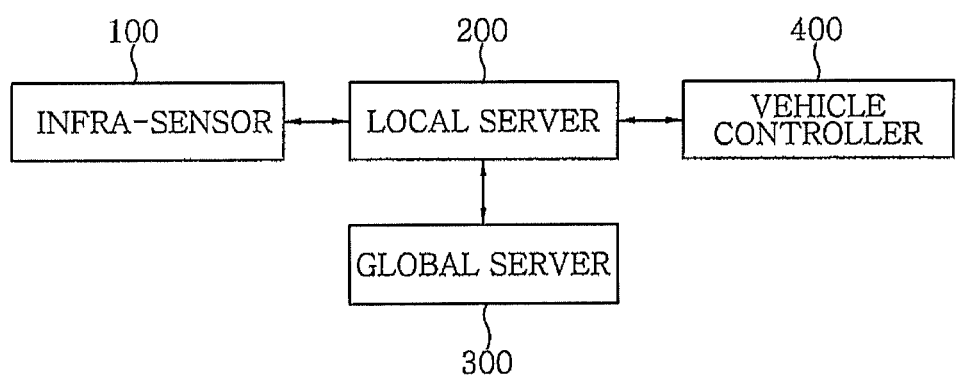
FIG. 2 illustrates a block diagram of the automatic vehicle guidance system in accordance with the embodiment of the present invention.

FIG. 2 illustrates a block diagram of the automatic vehicle guidance system in accordance with the embodiment of the present invention.

As shown in FIG. 2, the automatic vehicle guidance system includes at least one infra-sensor 100, at least one local server 200, a global server 300 and a vehicle controller 400.

The infra-sensor 100 is installed on roads. The infra-sensor 100 may include, e.g., a camera, a two-dimensional or three-dimensional laser scanner and an ultrasonic sensor. The infra-sensor 100 senses a variety of events, obstacles, vehicles and the like on the roads and transmits sensor data to the local server 200. Here, data communications between the infra-sensor 100 and the local server 200 may be performed via a wireless communications network.

The local server 200 operates in conjunction with the infra-sensor 100 and controls automatic vehicle guidance performed by the vehicle controller 400. To be specific, the local server 200 transmits sensing information generated by using the sensor data received from the infra-sensor 100 to the global server 300 and the vehicle controller 400, and transmits vehicle information and an automatic vehicle guidance service request message, which are received from the vehicle controller 400, to the global server 300. Further, the local server 200 transmits a driving control command received from the global server 300 in response to the automatic vehicle guidance request message to the vehicle controller 400. Here, data communications between the local server 200 and the global server 300 may be performed via a wired communications network, and data communications between the local server 200 and the vehicle controller 400 may be performed via a wireless communications network. The number of the local server 200 depends on a sensing range of the infra-sensor 100.

The global server 300 manages the local server 200 and the vehicle controller. 400 to provide an automatic vehicle guidance service. To be specific, the global server 300 generates and transmits a driving control command to the local server 200. The global server 300 generates the driving control command by the following sequential steps: registering the vehicle information received from the local server 200; generating a global path, i.e., a path from a starting point to a destination, by using road network data in response to the autonomous driving service request; checking whether blocking, i.e., impassable sections, exists on the global path based on the sensing information received from the local server 200; and searching for an alternative path when blocking exists on the global path.

The vehicle controller 400 is mounted on a vehicle. The vehicle controller 400 performs automatic vehicle guidance of the vehicle according to the driving control command generated by the global server 300. To be specific, the vehicle controller 400 generates a local path, i.e., a path within a control area of the local server 200, based on the driving control command and the sensing information received from the local server 200, and drives actuators of vehicle components to control, e.g., a steering wheel, an accelerator and a brake of the vehicle.

Figure 3:
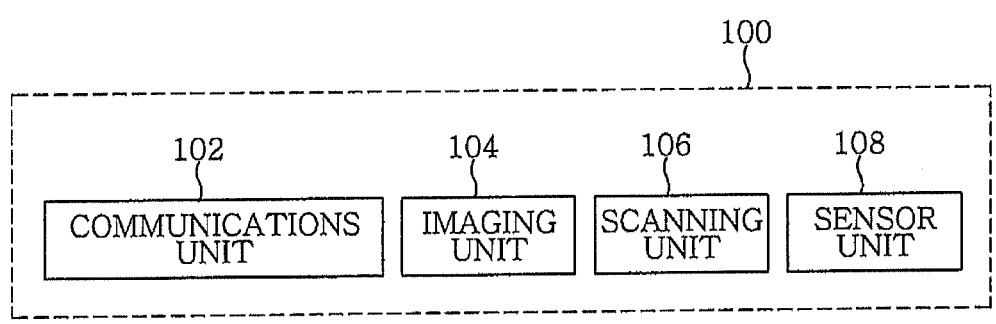
FIG. 3 illustrates a block diagram of the infra-sensor of FIG. 2.

FIG. 3 illustrates a block diagram of the infra-sensor 100 of FIG. 2.

As shown in FIG. 3, the infra-sensor 100 includes a communications unit 102, an imaging unit 104, a scanning unit 106 and a sensor unit 108.

The communications unit 102 includes a wireless communications module via which the infra-sensor 100 performs data communications with the local server 200 over a wireless communications network.

The imaging unit 104 takes images on vehicles, obstacles and various events, e.g., traffic accidents and road constructions, and transmits image data to the local server 200 via the communications unit 102. The image unit 104 may include a traffic CCTV (Closed-Circuit Television) and a traffic monitoring camera.

The scanning unit 106 scans images on vehicles and obstacles and transmits scan data to the local server 200 via the communications unit 102. The scanning unit 206 may include a two-dimensional or three-dimensional scanner.

The sensor unit 108 senses vehicles and obstacles and transmits sensing data to the local server 200 via the communications unit 102. The sensor unit 108 may include an ultrasonic sensor.

That is, the infra-sensor 100, which is installed on roads, transmits the image data taken by the image unit 104, the scan data scanned by the scanning unit 106 and the sensing data sensed by the sensor unit 108 to the local server 200 via the communications unit 102. Hereinafter, the image data, the scan data and the sensing data are together referred to as "sensor data".

Figure 4:
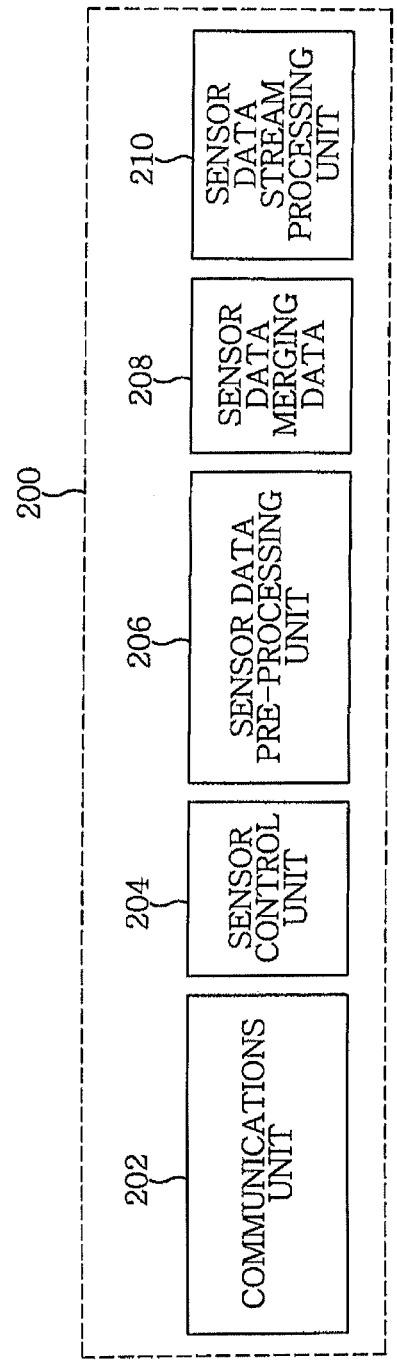
FIG. 4 illustrates a block diagram of the local server of FIG. 2.

FIG. 4 illustrates a block diagram of the local server of FIG. 2.

As shown in FIG. 4, the local server 200 includes a communications unit 202, a sensor control unit 204, a sensor data pre-processing unit 206, a sensor data merging unit 208 and a sensor data stream processing unit 210.

The communications unit 202 includes a wired communications module and a wireless communications module. The local server 200 performs wireless communications with the infra-sensor 100 and the vehicle controller 400 via the wireless communications module, while performing wired communications with the global server 300 via the wired communications module.

The sensor control unit 204 drives and controls the infra-sensor 100. To be specific, the sensor control unit 204 transmits control signals to the infra-sensor 100 via the communications unit 202. The control signals include an imaging control signal for the imaging unit 104, a scanning control signal for the scanning unit 106 and a sensor control signal for the sensor unit 108.

Further, when receiving the vehicle information and the automatic vehicle guidance service request from the vehicle controller 400, the sensor control unit 204 transmits the vehicle information and the automatic vehicle guidance service request along with the sensing information to the global server 300 via the communications unit 202, and transmits the driving control command received from the global server 300 and the sensing information to the vehicle controller 400 via the communications unit 202.

The sensor data pre-processing unit 206 performs pre-processing on the sensor data. To be specific, the sensor data pre-processing unit 206 performs noise-cancellation and line-extraction on the sensor data received from the infra-sensor 100 via the communications unit 202.

The sensor data merging unit 208 merges the sensor data to generate the sensing information. To be specific, the sensor data merging unit 208 merges image data, scan data and sensing data having been pre-processed by the sensor data pre-processing unit 206, and generates the sensing information, i.e., vehicle sensing information and obstacle sensing information.

The sensor data stream processing unit 210 stores the sensing information generated by the sensor data merging unit 208 and, when necessary, transmits the sensing information to the global server 300 and the vehicle controller 400 in data stream format via the communications unit 202.

FIGS. 5A and 5B illustrates explanatory views for data format of the sensing information generated by the local server 200, wherein FIG. 5A illustrates data format of the vehicle sensing information and FIG. 5B illustrates data format of the obstacle sensing information.

The vehicle sensing information needs to contain a location and a moving direction of a vehicle. As shown in FIG. 5A, the location of the vehicle can be represented by coordinates of four vertexes (x1, y1), (x2, y2), (x3, y3) and (x4, y4) of an MBR (Minimum Bounding Rectangle) enclosing the vehicle, and the moving direction of the vehicle can be represented by an angle θ with respect to true north The obstacle sensing information can be represented in a bitmap or vector form, as shown in FIG. 8B. In the bitmap form, the control area of the local server 200 is divided into grids and existence of an obstacle is denoted for each grid. In the vector form, the obstacle is represented by an MBR as in the vehicle sensing information. The bitmap form is mainly used when there are a relatively large number of obstacles, while the vector form is mainly used when there are a relatively small number of obstacles. If the sensor data merging unit 208 also generates event sensing information on events occurring on the roads, the event sensing information can be represented in the bitmap form or the vector form as in the obstacle sensing information.

Figure 6:
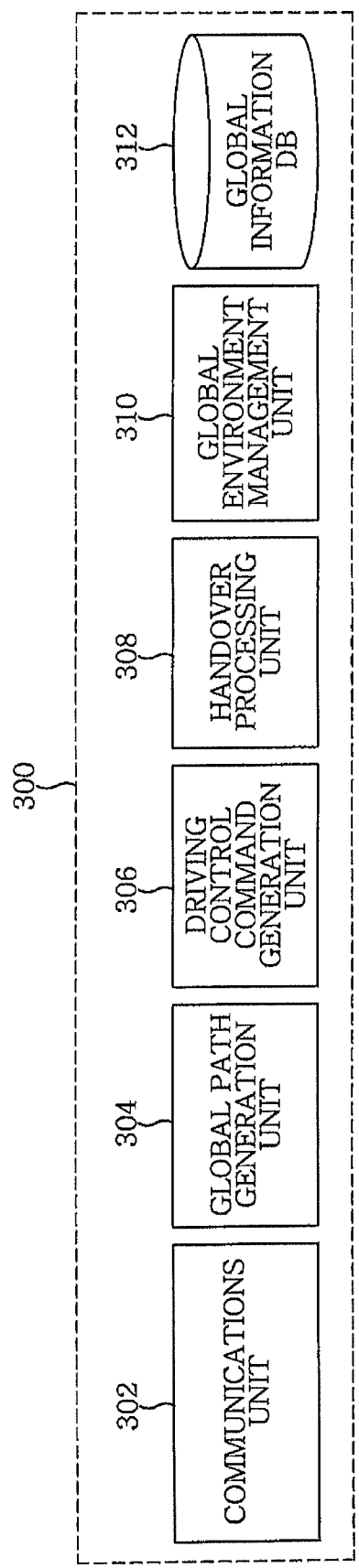
FIG. 6 illustrates a block diagram of the global server of FIG. 2.

FIG. 6 illustrates a block diagram of the global server 300 of FIG. 2.

As shown in FIG. 6, the global server 300 includes a communications unit 302, a global path generation unit 304, a driving control command generation unit 306, a handover processing unit 308, a global environment management unit 310 and a global information database (DB) 312.

The communications unit 302 includes a wired communications module through which the global server 300 performs data communications with the local server 200 via a wired communications network.

The global path generation unit 304 generates the global path by using the road network data. To be specific, in response to the automatic vehicle guidance service request received via the communications unit 302, the global path generation unit 304 generates the global path, i.e., an entire path from a starting point to a destination, by using the road network data stored in the global information DB 312.

The driving control command generation unit 306 generates the driving control command corresponding to the global path. To be specific, the driving control command generation unit 306 generates the driving control command by adding to the global path additional information, e.g., limiting speeds and driving lanes, and transmits the driving control command to the local server 200 via the communications unit 302. Further, the driving control command generation unit 306 determines whether blocking, i.e., an impassable section, exists on the global path based on the sensing information received via the communications unit 302. If it is determined that blocking exists on the global path, the driving control command generation unit 306 finds an alternative path and reflects the alternative path on the driving control command.

The handover processing unit 308 administrates a handover procedure of the vehicle between two local servers based on the vehicle sensing information. To be specific, when detecting based on the vehicle sensing information that the vehicle moves from one local server to another local server, the handover processing unit 308 transmits to the local servers a handover preparation message and a handover execution message. The handover preparation message and the handover execution message will be described in detail later.

The global environment management unit 310 manages environment information, i.e., the vehicle information, the road network data and local server information including identification number and a control area of each local server. To be specific, the global environment management unit 310 registers the vehicle information and the local server information and stores the road network data. The environment information may be stored in the global information DB 312.

Figure 7A:
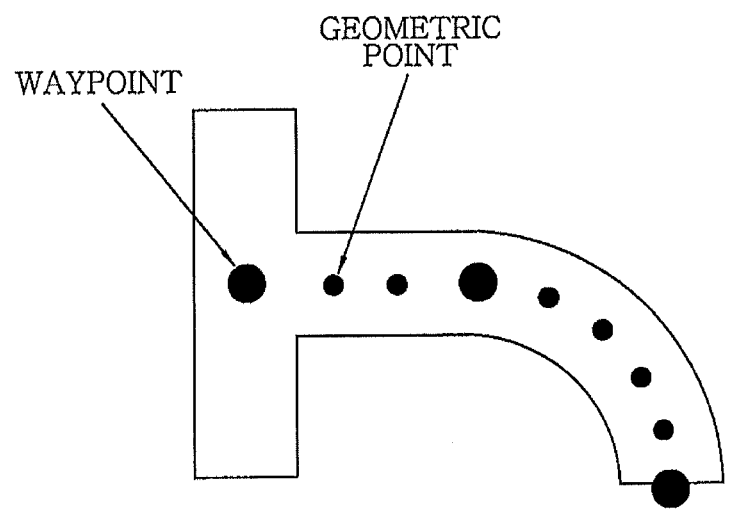
FIGS. 7A to 7C illustrate exemplary views for configuration of road network data managed by the global server.
Figure 7B:
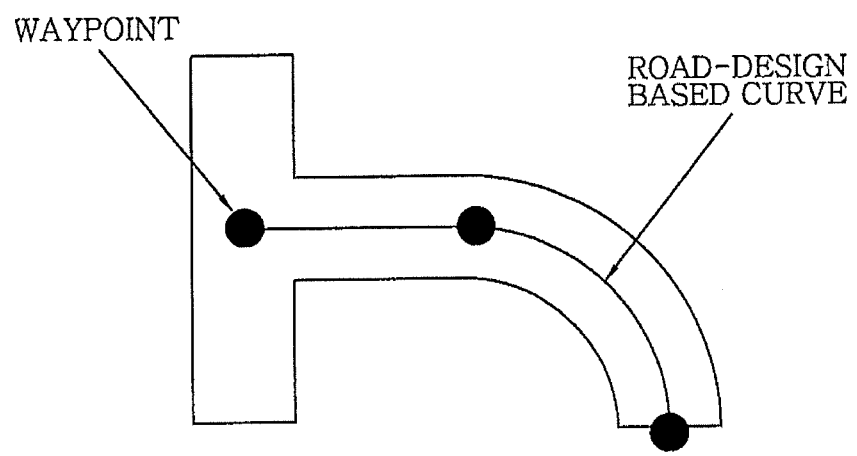
Figure 7C:
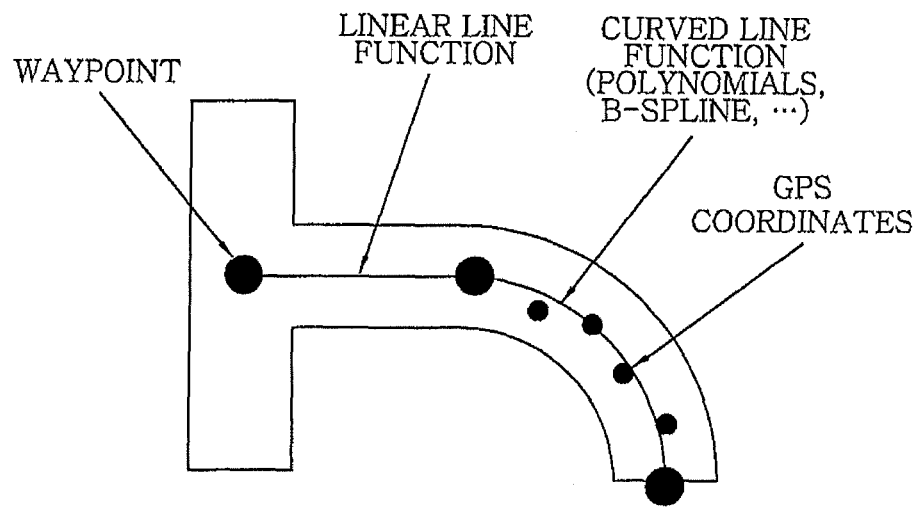

FIGS. 7A to 7C illustrate exemplary views for configuration of the road network data managed by the global server 300.

The road network data is required to represent not only node/link data structure for use in calculating a path but also an actual path along which a vehicle can actually drive. Road network data representation includes coordinates representation as shown in FIG. 7A, road-design based function representation as shown in FIG. 7B and coordinates approximation function representation as shown in FIG. 7C. Further, the road network data can be represented by combining two or more of the coordinates representation, the road design based function representation and the coordinates approximation function representation.

In the road network data, waypoints are critical points on the roads and include nodes, e.g., intersections and points where attributes of the roads change, and points where driving mode of a vehicle needs to be changed. Meanwhile, since the vehicle controller 400 cannot track the roads if distances between adjacent waypoints are long, information on sections between adjacent waypoints needs to be provided.

In the coordinates representation as shown in FIG. 7A, a section between two adjacent waypoints is represented by geometric points, i.e., coordinates of points within the section. Here, the geometric points are generated such that intervals of the geometric points on a curved line are relatively shorter than those on a straight line. The coordinates representation can be used for areas where vehicles having various road-tracking algorithms are allowed to perform autonomous driving. In the road-design based function representation and coordinates approximation function representation, the section is represented by a function.

In the road-design based function representation as shown in FIG. 7B, the section is represented by a road-design function, which is a function of curvature information, e.g., clothoid curve and circular curve, on the roads designed while considering vehicle speeds and various attributes of the road, e.g., slope angles and friction forces.

In the coordinates approximation function representation as shown in FIG. 7C, the section is represented by a linear line or curved line function, which is an approximation function, e.g., a least-squares approximation function, of GPS (Global Positioning System) coordinates of the section. The coordinates approximation function representation can be used when the section is not an ordinary road or when road-design information cannot be obtained. The curved line function may be polynomials and B-spline, for example.

Figure 8:
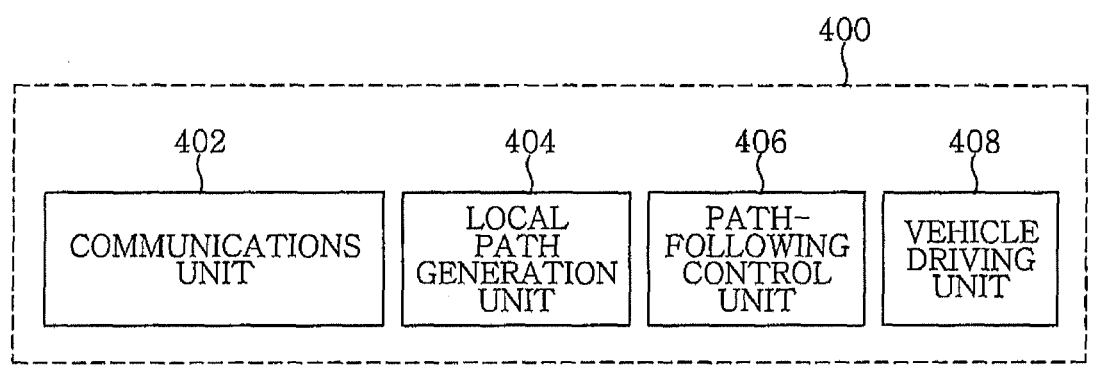
FIG. 8 illustrates a block diagram of the vehicle controller of FIG. 2.

FIG. 8 illustrates a block diagram of the vehicle controller 400 of FIG. 2.

As shown in FIG. 8, the vehicle controller 4000 includes a communications unit 402, a local path generation unit 404, a path-following control unit 406 and a vehicle driving unit 408.

The communications unit 402 includes a wireless communications module via which the vehicle controller 400 performs data communications with the local server 200 over a wireless network.

The local path generation unit 404 generates, in response to the driving control command, a local path by using the sensing information. When receiving an automatic vehicle guidance service request from a user, the local path generation unit 404 transmits the vehicle information and the automatic vehicle guidance service request to the local server 200 via the communications unit 402. When receiving the driving control command from the local server 200 via the communications unit 402, the local path generation unit 404 generates the local path, i.e., a path for avoiding obstacles and events within the control area of the local server 200, by using the sensing information, i.e., the obstacle sensing information and the event sensing information.

The path-following control unit 406 controls driving of the vehicle in order to follow the local path generated by the local path generation unit 404. To be specific, the path-following control unit 406 generates actuator control signals for controlling actuators of the vehicle such that automatic vehicle guidance along the local path can be achieved.

The vehicle driving unit 408 drives actuators of the vehicle, e.g., accelerator actuators, brake actuators and steering wheel actuators, according to the actuator control signals, thereby performing automatic vehicle guidance.

Figure 9:
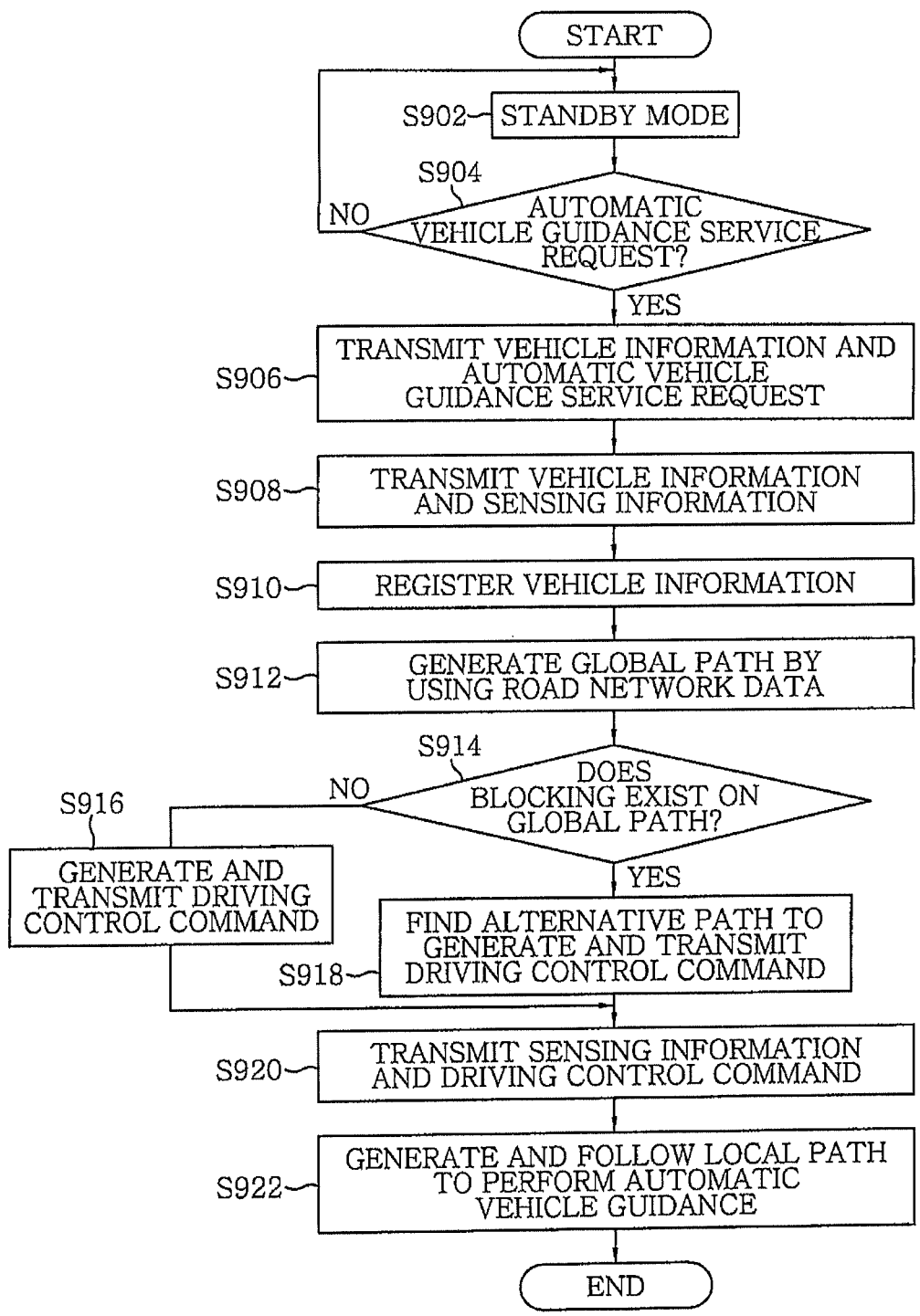
FIG. 9 illustrates a flowchart of an automatic vehicle guidance method using the automatic vehicle guidance system of FIG. 2.

FIG. 9 illustrates a flowchart of an automatic vehicle guidance method using the automatic vehicle guidance system of FIG. 2.

As shown in FIG. 9, the automatic vehicle guidance system is initially set to a standby mode (step S902). In the standby mode, the vehicle controller 400 checks whether an automatic vehicle guidance service request is received from a user (step S904).

If it is determined in the step S904 that the automatic vehicle guidance service request is received, the vehicle controller 400 transmits vehicle information, e.g., a vehicle number, a vehicle type and driver information, along with an automatic vehicle guidance service request message to the local server 200 via a wireless communication network (step S906).

Then, the local server 200 transmits to the global server 300 via a wired communications network the vehicle information and the automatic vehicle guidance service request message along with the sensing information generated by using the sensor data periodically received from the infra-sensor 100, i.e., image data, scan data and sensing data (step S908). As described above, the sensing information may include the vehicle sensing information having data format shown in FIG. 5A and the obstacle sensing information having data format shown in FIG. 5B.

The global server 300 registers the vehicle information received from the local server 200 (step S910). Then, the global server 300 generates a global path, i.e., the entire path from a starting point to a destination, by using the road network data (step S912). As described above, representation for the road network data may include the coordinates representation as shown in FIG. 7A, the road-design based function representation as shown in FIG. 7B and the coordinates approximation function representation as shown in FIG. 7C. Further, the road network data can be represented by combining two or more of the coordinates representation, the road design based function representation and the coordinates approximation function representation.

The global server 300 checks whether blocking, i.e., an impassable section, exists on the global path generated in the step S912 by using the sensing information received from the local server 200 (step S914).

If it is determined in the step S914 that no blocking exists on the global path, the global server 300 generates a driving control command (step S916). The driving control command may include additional information, e.g., limiting speeds and driving lanes.

Meanwhile, if it is determined in the step S914 that blocking exists on the global path, the global server 300 finds an alternative path for avoiding the blocking on the global path and generates a driving control command reflecting the alternative path (step S918).

The global server 300 transmits the driving control command generated in the step S916 or S918 to the local server 200 via a wired communications network, and then the local server 200 transmits the driving control command, along with the sensing information generated by using the sensor data received from the infra-sensor 100, to the vehicle controller 400 via a wireless communications network (step S920).

The vehicle controller 400 generates a local path, i.e., a path for avoiding the obstacles and events, based on the driving control command and the sensing information received from the local server 200 in the step S920, thereby driving actuators of the vehicle to perform automatic vehicle guidance following the local path (step S922).

Figure 10:
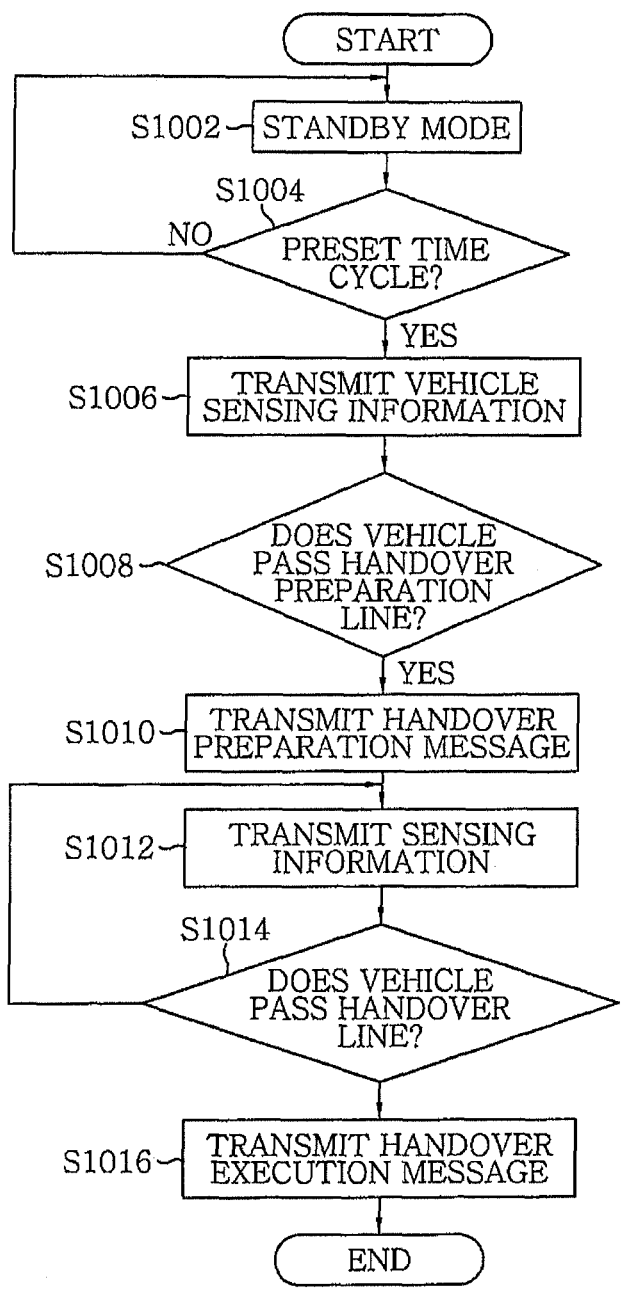
FIG. 10 illustrates a flowchart of a handover procedure performed in the automatic vehicle guidance system of FIG. 2.

FIG. 10 illustrates a flowchart of a handover procedure performed in the automatic vehicle guidance system of FIG. 2.

Below, it is assumed that control on automatic vehicle guidance for a vehicle is handed over from a first local server 200 to a second local server 200.

As shown in FIG. 10, the automatic vehicle guidance system is initially set to be in a standby mode (step S1002). In the standby mode, the first local server 200 checks whether a preset time cycle, e.g., one minute, five minutes and ten minutes, has elapsed (step S1004).

If it is determined in the step S1004 that the preset time cycle has elapsed, the first local server 200 requests the infra-sensor 100 to transmit the sensor data, i.e., sensor data sensed within the control area of the first local server 200. The first local server 200 generates the sensing information, i.e., the vehicle sensing information, the obstacle sensing information and the event sensing information, based on the sensor data received from the infra-sensor 100 and periodically transmits the sensing information to the global server 300 (step S1006).

The global server 300 checks, based on the vehicle sensing information received from the first local server 200 in the step S1006, whether the vehicle passes a handover preparation line from the first local server 200 to the second local server 200 (step S1008). The handover preparation line is a preset imaginary line within the control area of the first local server 200, and the global server 300 determines that the handover is likely to occur if the vehicle moves across the handover preparation line toward the center of the control area of the second local server 200. The handover preparation line may lie within the intersectional area of the control areas of the first and the second local server.

If it is determined in the step S1008 that the vehicle passes the handover preparation line, the global server 300 transmits a handover preparation message to the first and the second local server 200, and then the first local server 200 transmits the handover preparation message to the vehicle controller 400 (step S1010).

Meanwhile, in response to the handover preparation message, the second local server 200 transmits to the vehicle controller 400 the sensing information generated by using the sensor data received from the infra-sensor 100 within the control area of the second local server 200 (step S1012). At this time, the first local server 200 still transmits to the vehicle controller 200 the sensing information generated by using the sensor data received from the infra-sensor 100 within the control area of the first local server 200. The first and the second local server 200 also transmit the sensing information to the global server 300.

The global server 300 checks, based on the sensing information received from the first and the second local server 200, whether the vehicle passes a handover line from the first local server 200 to the second local server 200 (step S1014). The handover line is a preset imaginary line within the intersectional area of the control areas of the first and the second local server, and the global server 300 determines that the handover is required to be executed if the vehicle moves across the handover line toward the center of the control area of the second local server 200.

If it is determined in the step S1014 that the vehicle passes the handover line, the global server 300 transmits a handover execution messages to the first and the second local server 200 (step S1016). The handover execution message transmitted to the first local server 200 may include a message indicative of completion of vehicle control, while the handover execution message transmitted to the second local server 200 may include a message indicative of start of vehicle control.

Below, techniques for avoiding obstacles near the handover line will be described with reference to FIGS. 11 and 12.

In the automatic vehicle guidance based on the sensing information of the infra-sensor 100, an automatic vehicle guidance service area is divided into control areas of local servers 200. The handover occurs when a vehicle passes the handover line. For smooth automatic vehicle guidance, effective solutions for the vehicle to avoid an obstacle near the handover line are required.

Figure 11:
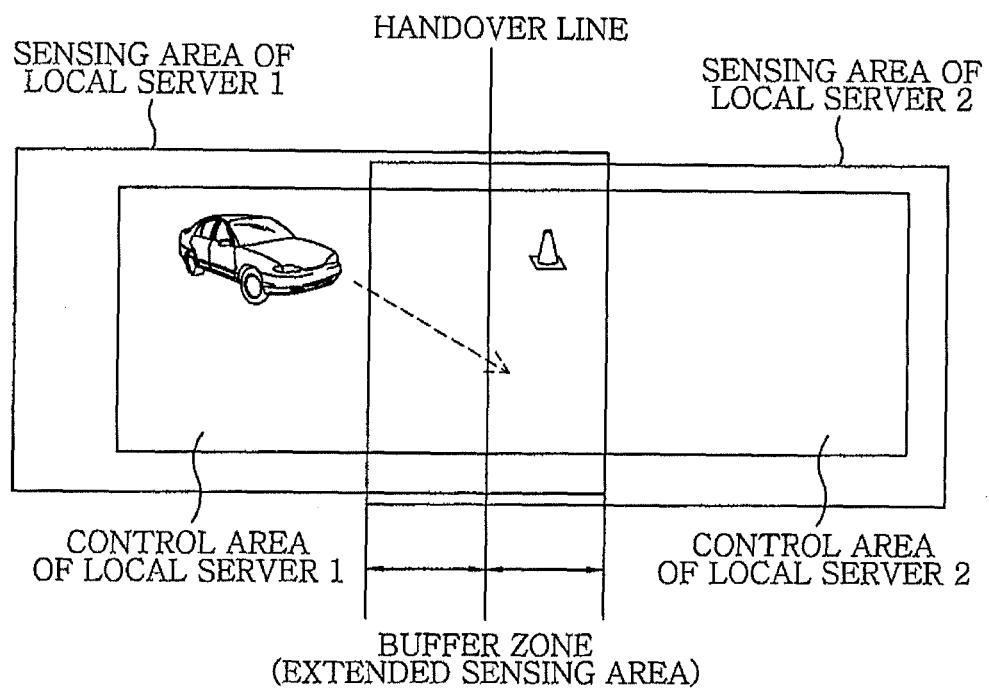
FIG. 11 illustrates an explanatory view of a buffer zone for extended sensor areas.

FIG. 11 illustrates an explanatory view of a buffer zone for extended sensor areas.

Besides the control area, each local server 200 has a sensor area. As shown in FIG. 11, if a control area of each local server 200 is set to be smaller than the sensor area and sensor areas of adjacent local servers 200 are set to be overlapped with each other, the local server 200 can sense an obstacle disposed out of the control area thereof but within the overlapped area, i.e., a buffer zone. Therefore, the vehicle can be prevented from running into the obstacle during the handover.

Figure 12:
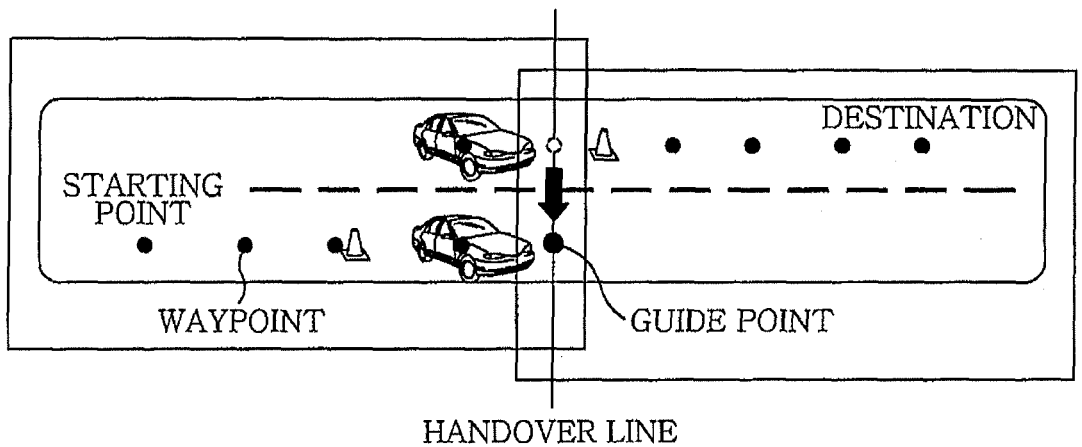
FIG. 12 illustrates an explanatory view for a guide point.

FIG. 12 illustrates an explanatory view for a guide point.

As shown in FIG. 12, if an obstacle exists within a specific distance from the handover line, the global server 300 sets a guide point on the handover line, i.e., dynamically adds coordinates of the guide point similar to the waypoints. To be specific, the global server 300 deletes one or more waypoints on the global path and adds the guide point to the global path. Therefore, the vehicle can be guided to smoothly avoid the obstacle.

Figure 13:
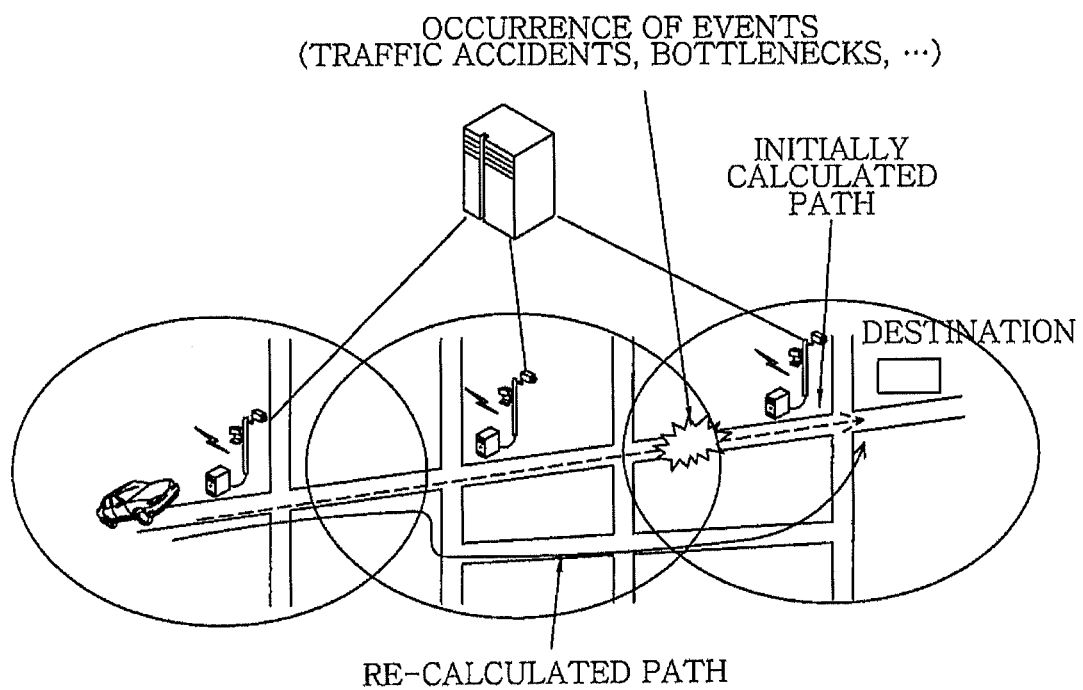
FIG. 13 illustrates an explanatory view for re-calculation of a global path.

FIG. 13 illustrates an explanatory view for re-calculation of global path.

As shown in FIG. 13, events, e.g., traffic accidents, and bottlenecks, occurring in an automatic vehicle guidance service area can be detected based on the sensing information generated by using the sensor data of the infra-sensor 100. If an event is detected on the global path, the global server 300 re-calculates the global path. Therefore, the vehicle can be guided to arrive at a desired destination along an optimal path in an optimum time.

While the invention has been shown and described with respect to the embodiments, it will be understood by those skilled in the art that various changes and modification may be made without departing from the scope of the invention as defined in the following claims.

What is claimed is:

1. A vehicle controller, comprising:
   a communications unit for performing data communications with local servers;
   a local path generation unit for generating, in response to an automatic vehicle guidance service request, a local path based on a driving control command and sensing information received from the local servers via the communications unit;
   a path-following control unit for generating actuator control signals for controlling actuators of a vehicle to drive the vehicle along the local path; and
   a vehicle driving unit for driving the actuators according to the actuator control signals.

2. The vehicle controller of claim 1, wherein the driving control command includes a global path from a starting point to a destination.

3. The vehicle controller of claim 2, wherein the sensing information includes at least one of vehicle sensing information and obstacle sensing information, the vehicle sensing information being information on the vehicle and the obstacle sensing information being information on obstacles on roads.

4. A local server, comprising:
   a communications unit for performing wireless communications with a vehicle controller and an infra-sensor while performing wired communications with a global server;
   a sensor control unit for controlling the infra-sensor, transmitting to the global server vehicle information and an automatic vehicle guidance service request message received from the vehicle controller and transmitting to the vehicle controller a driving control command received from the global server;
   a sensor data pre-processing unit for pre-processing sensor data received from the infra- sensor;
   a sensor data merging unit for merging the pre-processed sensor data to generate sensing information; and
   a sensor data stream processing unit for storing the sensing information and transmitting the sensing information to the global server and the vehicle controller via the communications unit.

5. The local server of claim 4, wherein the driving control command includes a global path from a starting point to a destination.

6. The local server of claim 5, wherein the sensing information includes at least one of vehicle sensing information and obstacle sensing information, the vehicle sensing information being information on the vehicle and the obstacle sensing information being information on obstacles on roads.

7. A global server, comprising:
   a communications unit for performing data communications with local servers;
   a global path generation unit for generating, in response to an autonomous driving service request message received from the local servers, a global path from a starting point to a destination by using road network data;
   a driving control command generation unit for generating, based on sensing information received from the local servers, a driving control command for guiding a vehicle along the global path and transmitting the driving control command to the local servers;
   a handover processing unit for administrating a handover procedure, between the local servers, on control of automatic vehicle guidance; and
   a global environment management unit for registering vehicle information received from the local servers, registering the local servers and managing the road network data,
   wherein the driving control command generation unit selectively finds an alternative path based on the sensing information and reflects the alternative path on the driving control command.

8. The global server of claim 7, wherein the driving control command includes the global path, the alternative path and additional information on a vehicle speed and driving lanes.

9. The global server of claim 8, wherein the sensing information includes at least one of vehicle sensing information and obstacle sensing information, the vehicle sensing information being information on the vehicle and the obstacle sensing information being information on obstacles on roads.

10. The global server of claim 9, wherein in the road network data, a section between two adjacent waypoints is represented by at least one of coordinates of points within the section, a road-design function and an approximation function.

* * * * *